Feb. 20, 1968    P. D. WICKERSHAM    3,370,232
SWITCHING APPARATUS FOR VERIFYING THE RESISTIVE
INTEGRITY OF ELECTRICAL WIRING SYSTEMS

Filed May 7, 1965             4 Sheets-Sheet 1

INVENTOR.
Price D. Wickersham
BY
Hovey, Schmidt, Johnson & Hovey
ATTORNEYS.

000-009
Output Control   Input Control

INVENTOR.
Price D. Wickersham

United States Patent Office 3,370,232
Patented Feb. 20, 1968

3,370,232
SWITCHING APPARATUS FOR VERIFYING THE RESISTIVE INTEGRITY OF ELECTRICAL WIRING SYSTEMS
Price D. Wickersham, Shawnee Mission, Kans., assignor to Xebec Corporation, a corporation of Missouri
Filed May 7, 1965, Ser. No. 453,924
9 Claims. (Cl. 324—73)

This invention relates to the automatic circuit analyzer art and, more particularly, to control and switching apparatus for use in a circuit testing system which substantially reduces the number of switching operations and the number of system components required to effect the desired tests, and increases the speed and efficiency of the system.

The design of automatic apparatus to test electrical circuitry of various types began somewhat over a decade ago and, during the intervening period, has progressed from relatively simple electromechanical relay switching and control systems to large, fairly complex electronic systems of some sophistication. The development of automatic circuit analyzer apparatus stemmed from the need to perform tests on electrical circuitry rapidly, at low cost, and without error, the latter being a definite factor if such tests were to be performed manually. Most importantly, a technician is often unable to perform the required tests using manual methods, necessitating that automatic means be employed.

An apparatus of the type disclosed herein, generally speaking, performs two basic types of tests. First, a continuity resistance test which comprises a check between two specified terminals of an electrical system to determine whether or not the electrical resistance between these two points is equal to or less than a prescribed amount. Secondly, an insulation resistance test between one particular selected terminal and a variable sized (usually large) group of several terminals, such group of terminals being electrically shorted together to thereby form a second node or terminal of the two-point test. In this second test mode, the acceptance or test pass criterion is that the resistance shall be equal to or greater than a prescribed value.

Although the instant invention may be utilized in a wide number of applications to perform tests of various types with respect to the two selected test points (such as capacitance or inductance tests, determination of the existence of proper electrical potential, etc.), in this specification for purposes of illustration it will be assumed that the apparatus is utilized to perform the aforesaid resistance tests. Exemplary applications of resistance testing apparatus include the testing of simple to complex (particularly the latter) electrical wiring systems such as commonly found in interconnecting cabling systems of aircraft, aerospace vehicles, or computers.

Continuity tests as briefly described above could be performed manually; however, when terminations are numbered in the thousands or tens of thousands, manual testing becomes extremely time-consuming. In contrast to this, the insulation tests set forth above cannot be done manually if the resistance between one termination and a group of other terminations is a required measurement, because it is not practical to manually short together the usually large group of terminations forming the second node of the test. A corollary feature associated with automatic insulation testing is the ability of the test apparatus to scan the selected group of terminals, when a test fail condition is encountered, to identify the particular error terminal or terminals in the shorted group.

In order to utilize automatic circuit analyzers and thus derive the benefits to be attained through the elimination of the necessity of manual circuit testing, the unit to be tested is provided with a number of test terminals which are coupled with the testing apparatus during operation thereof. In complex systems, these test terminals may easily number in the thousands. In accordance with a predetermined program, the testing apparatus, through programmably controlled switching means, moves from one set of test terminals to another to effect the desired tests. Manifestly, the complexity of the switching arrangement is a function of the number of test terminals which must be serviced by the testing apparatus, and the efficiency of the latter is, at least in part, measured by the speed at which the testing apparatus can execute the complete test program.

It is, therefore, the primary object of the instant invention to provide an improved switching arrangement for use in automatic circuit analyzing equipment which is capable of effecting test connections to a larger number of test terminals with a lesser number of programmably controlled switching components than utilized in testing equipment of the prior art.

As a corollary to the aforesaid object, it is an important aim of the instant invention to provide a versatile switching system for use in circuit testing equipment which is capable of effecting test connections to either a pair of selected test terminals or one selected test terminal and a group of other selected test terminals with a minimum number of switching operations and control programming.

Other objects will become apparent as the detailed description proceeds.

Figure 4:
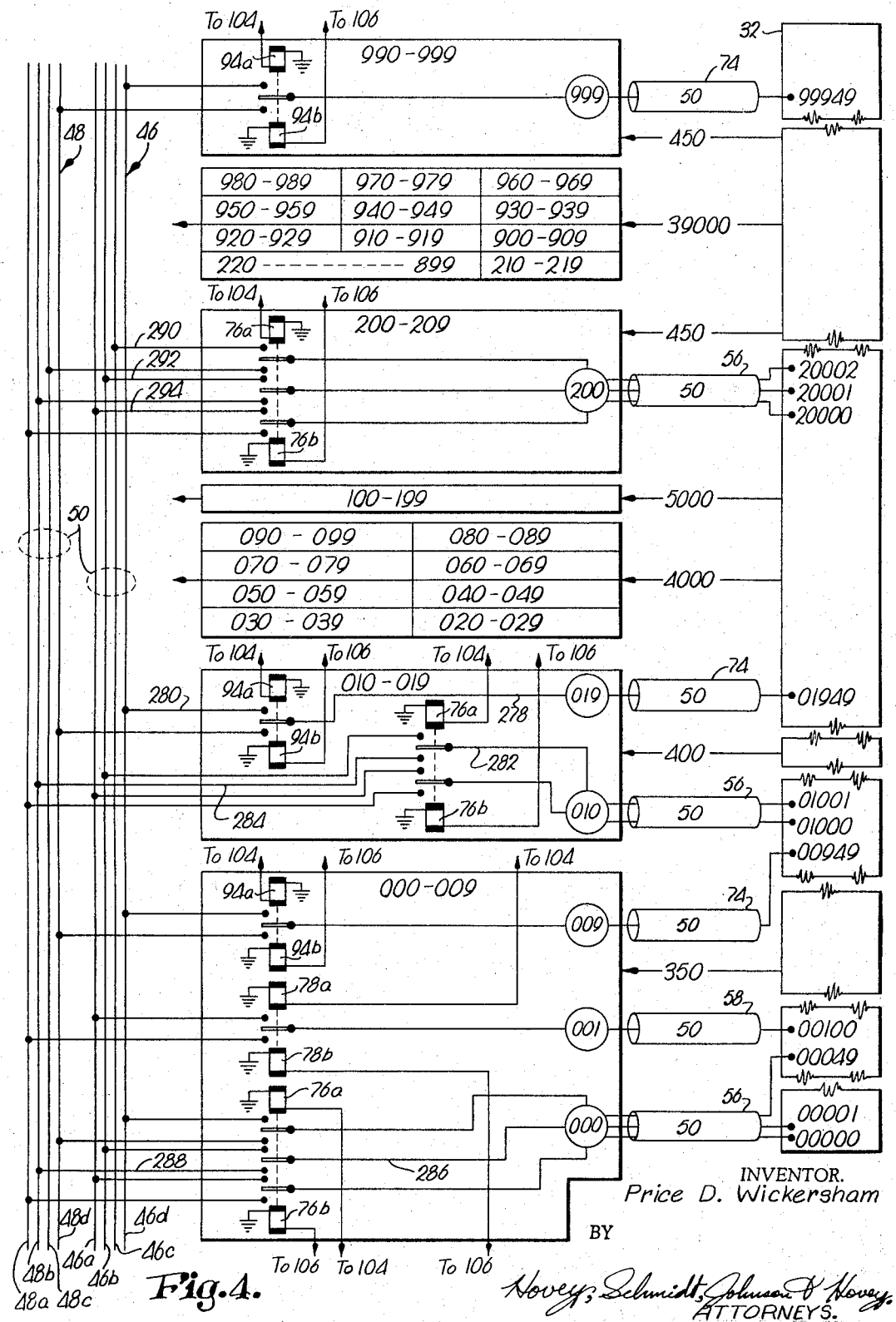
FIG. 4 is a diagrammatic and schematic illustration of the switching modules shown connected to the test terminals of a unit under test.
Figure 5:
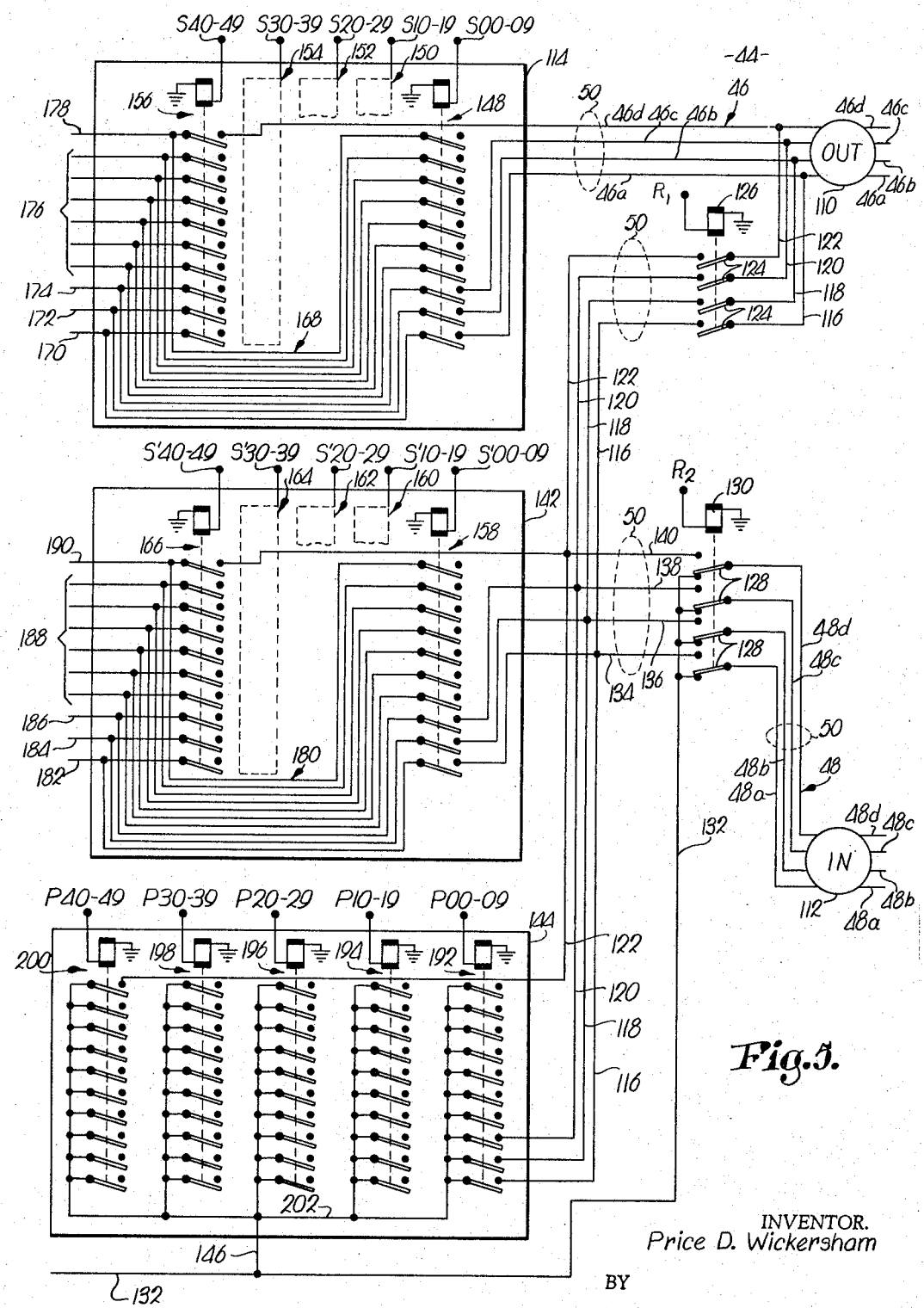
FIG. 5 is an electrical schematic diagram showing a portion of the master selector station.
Figure 6:
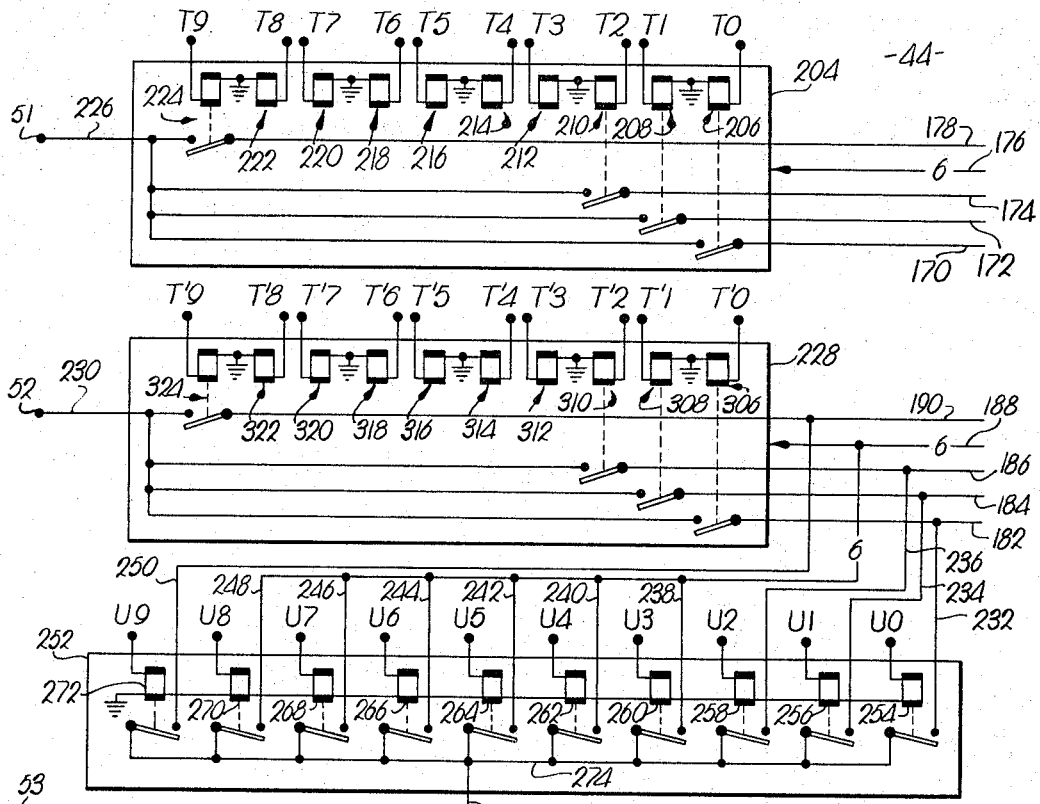
FIG. 6 is an electrical schematic diagram showing the remainder of the master selector station.

It should be understood that FIGS. 4, 5 and 6 comprise a showing of the complete switching apparatus except for certain control functions, the structures in these figures being interconnected as illustrated by the electrical leads bearing like reference numerals.

*Definitions of terminology and diagrammatic illustrations*

The testing system is illustrated herein as capable of accommodating a unit under test having 50,000 terminations or test terminals. As is the practice in the art, these test terminals are assigned addresses which serve to designate the various terminals. The addresses utilized herein comprise five digit, decimal system numbers.

During a test, the test terminals are connected to switching modules, the latter forming a part of the circuit analyzer system. Each switching module illustrated herein is provided with ten connectors, each having fifty pins. These pins, or the terminal connections lines which couple the connector pins with the test terminals, also are designated by addresses in the same manner as the test terminals, it being intended that pins and terminals of like addresses will be interconnected when it is desired to couple the testing system with the unit to be tested.

The first three digits of each terminal or pin address designate the particular connector, while the last two digits represent the pin within that particular connector. Serial addresses are utilized, beginning with pin or terminal 00000 and ending with pin or terminal 99949. Thus, a total of 50,000 terminals are addressed, the first terminal corresponding to pin 00 of connector 000, and the last terminal corresponding to pin 49 of connector 999. Thus, the first switching module is designated 000–009 since it contains the first ten addressed connectors. Likewise, the last addressed or 100th switching module is designated 990–999 since it includes the last ten addressed connectors.

Due to the great number of electrical leads needed in a testing system of the type to be described hereinafter, groups of leads or cables are designated as shown in FIG. 4 where it may be seen, beginning at the upper right-hand portion of the figure, that the numerals 50, 450, 39,000 etc. are associated with diagrammatic symbolisms representing electrical cables or leads. Each of these numerals indicates the number of actual leads employed in the illustrated connection.

To further simplify the description to follow, the definitions presented below are employed:

(a) *Output terminal.*—The first terminal addressed in a two-point continuity test or, in insulation tests, the single terminal selected for insulation resistance determination between it and all other terminals of either lower or higher order addresses.

(b) *Input terminal.*—The second terminal selected in a two-point continuity test.

(c) *Short line.*—The single connection comprising a shorted group of several terminals, used as the second test connection in an insulation test.

The testing system in general

Figure 1:
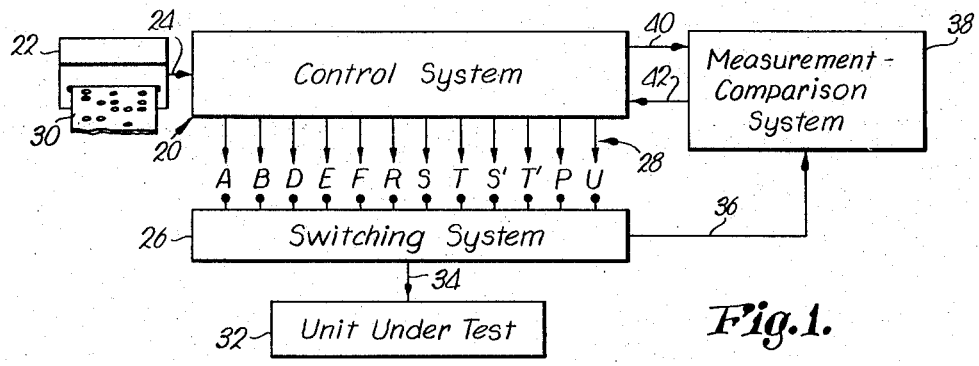
FIGURE 1 is a block diagram showing the interrelationship between the subsystems of the circuit analyzer.

Referring to FIG. 1, a programmable control system 20 is shown provided with a tape reader 22 having a read signal output 24 coupled with the decoding and read signal responsive command circuitry of the control system which effects operation of the switching system 26 via a number of control lines 28 coupled with control terminals of the switching system designated A, B, D, E, F, R, S, T, S', T', P and U. A stretch of punched tape 30 is received by reader 22 in the conventional manner and the information thereon read from the tape and converted into read signals. Thus, control system 20 comprises a means of storing a pre-programmed series of test instructions and converting such instructions into the necessary test condition and switching system control stimuli to effect the desired testing operation.

Although punched tape is shown as the means of storing the programmed instructions, it should be appreciated that a number of commonly known methods may be employed such as punched cards, magnetic tape, manually set switches, magnetic drum, or magnetic core storage. The test instructions consist of the necessary information which must be made available to the test apparatus in order that the same may perform the test desired. Such information will contain all or a portion of the following information categories:

(a) Terminal addresses
(b) Test pass or fail criteria
(c) Test voltage or current levels
(d) Test duration time
(e) Type of test instruction From the foregoing it may be seen that the control system 20 provides detailed instructions to the switching system 26 via electrical interconnections 28 to enable the switching system to perform the various required modes of selection and shorting of test terminals in the unit under test 32. Switching system 26 has a termination capacity equal to or larger than the number of terminations presented by unit 32, interconnecting adapter cables being illustrated at 34. As mentioned above, the switching system to be described in detail hereinafter is illustrated as having a 50,000 terminal capacity. It will be seen as this specification progresses, however, that the capacity of the system may be readily increased by adding to the number of switching modules.

Acting under instructions from control system 20, the switching system 26 presents a pair of test connections illustrated at 36 to a measurement-comparison system 38. The measurement-comparison system 38 provides the necessary test stimuli in accordance with instructions from control system 20 via interconnecting leads 40. Such test stimuli comprise voltages or currents applied to the selected test terminals of unit 32 via paths of electrical continuity through switching system 26. Measurement-comparison system 38 transmits the results of a continuity or an insulation test via interconnection 42 to control system 20 for display, recording, or other action by the latter. The test results reaching the control system through interconnections 42 may be actual measured values in digitally coded form or may comprise simple test pass or test fail comparison signals, or both. Digitally coded information as to allowed maximum or minimum resistance levels are transmitted to the comparitor 38 via interconnections 40.

Figure 2:
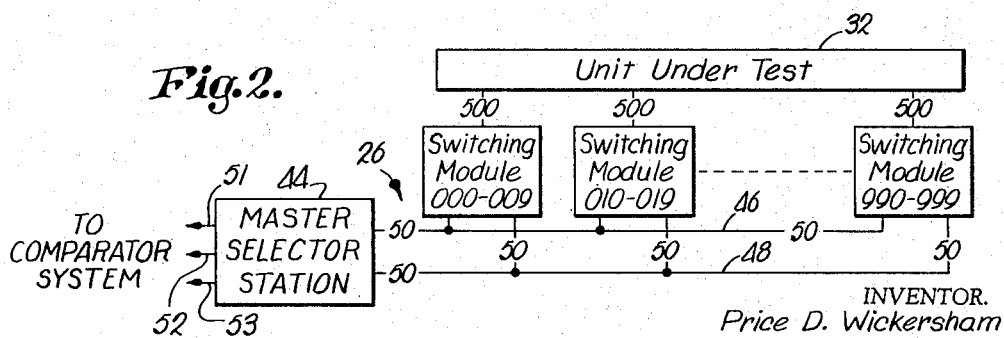
FIG. 2 is a block diagram showing the switching system subassemblies.

In FIG. 2, switching system 26 is shown diagrammatically divided into its subassemblies. A master selector station 44 is shown connected to the various switching modules by a 50-conductor output bus 46 and a 50-conductor input bus 48. Buses 46 and 48 are common to all of the switching modules and are connected thereto by 50-conductor branch lines as shown. Although only three switching modules are illustrated in FIG. 2, it will be appreciated that the remaining ninety-seven modules (not shown) are coupled with the buses in like manner.

Each switching module is provided with ten 50-conductor adapter cables which connect the module with the unit under test 32. Thus, each switching module is connected to 500 test terminals during operation of the testing system. It will be appreciated hereinafter that the action of the switching modules and the master selector station ultimately establishes electrical continuity between the desired test terminals and two of the three connection points of the selector station output illustrated at 51, 52 and 53.

Switching modules

Figure 3:
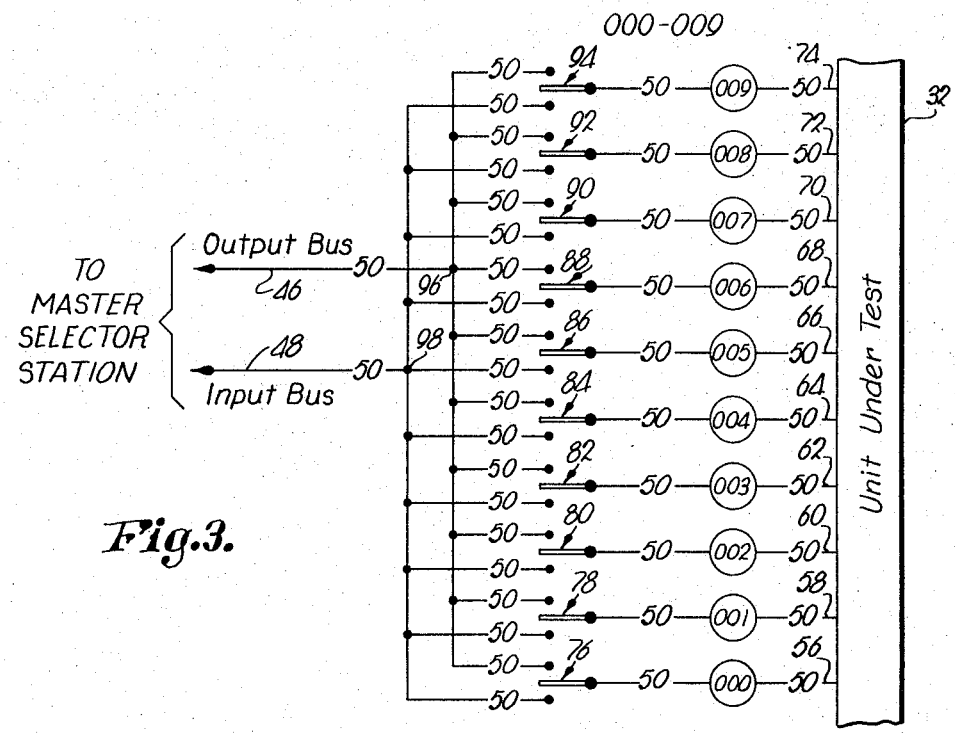
FIG. 3 is a schematic diagram of one of the switching modules of the instant invention.
Figure 7:
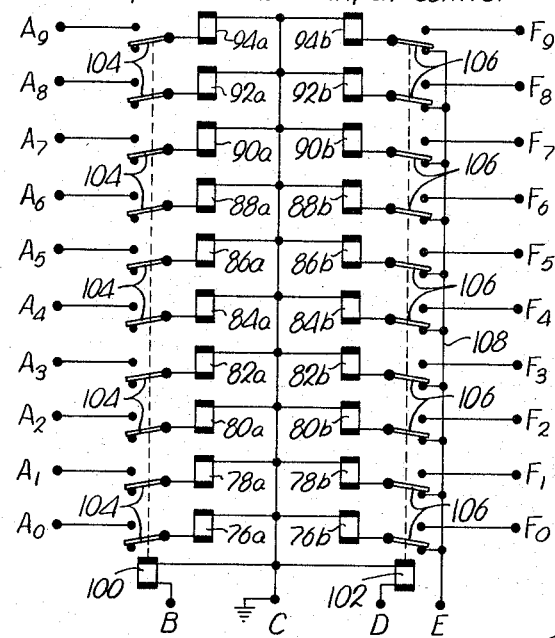
FIG. 7 is an electrical schematic diagram showing the circuitry utilized in the control of each of the switching modules.

FIGS. 3 and 7 illustrate module 000–009 in detail. In FIG. 3 the ten adapter cables for this module are shown at 56, 58, 60, 62, 64, 66, 68, 70, 72 and 74. Each adapter cable comprises a group of fifty terminal connector lines which interconnects a connector of the module and fifty test terminals of unit 32 having like addresses. The ten connectors of modules 000–009 are designated in FIG. 3 by their addresses, i.e., 000, 001 . . . 009. Since each connector has fifty pins, cable 66, for example, connects pins 00500, 00501 . . . 00549 to test terminals 00500, 00501 . . . 00549 of unit 32.

The connectors schematically illustrated in FIG. 3 comprise conventional multiconductor cable connectors and are mounted on the chassis of the switching module. A 50-pole relay is associated with each connector, such relays being designated 76, 78, 80, 82, 84, 86, 88, 90, 92 and 94. It should be understood that the fifty movable poles and associated fixed contacts of each relay are schematically illustrated in FIG. 3 as a single pole and two fixed contacts each connected with fifty leads; the associated relay coils are not shown. The upper contacts of the poles of each relay are interconnected as illustrated and join with the fifty conductors of output bus 46 at junction 96. Likewise, the lower contacts of the poles of each relay are interconnected and join with the fifty conductors of input bus 48 at junction 98. Address integrity is maintained in the interconnection of each bus with the corresponding contacts of the relays so that each conductor in the buses will be connected to the pins in respective connectors having like addresses when the movable poles engage their upper contacts.

In FIG. 7 the coils of relays 76-94 are shown connected with control circuitry forming a part of the switching module. Each relay has two coils designated by the same reference numerals as the relay followed by the "a" or "b" notation. The two relay coils of each relay are arranged so that energization of one coil moves the fifty poles of the relay into engagement with a group of contacts connected to the output bus, while energization of the other coil shifts the poles into engagement with contacts coupled with the input bus. Normally, with both coils de-energized, the poles do not engage either group of contacts, this normal or de-energized position being illustrated in FIG. 3.

It should be understood at this juncture that the relay configuration herein shown and described is representative of only one possible eletrical device which could be utilized to execute the logic functions of the instant invention. Fifty pole relays having a single, polarized coil could also be employed, or solid state switching devices could also be utilized with equal success. For clarity of presentation, however, the description to follow will be based on the utilization of the double coil relays shown, it being appreciated that this relay configuration is exemplary only.

The various relay coils 76a-94a, when energized, shift their respective poles into engagement with the contacts connected to output bus 46. In like fashion, relay coils 76b-94b connect their respective poles with input bus 48 upon energization.

In FIG. 7, control terminals $A_0$ through $A_9$, B, C, D, E, and $F_0$ through $F_9$ are shown. These terminals are utilized to control the energization of the ten 50-pole relays in accordance with the function that is needed to effect a particular test. Terminals B and D are connected to relay coils 100 and 102, respectively, terminal C comprising a ground connection which is common to coils 100 and 102 as well as coils 76a-94a and 76b-94b.

Ten relay switches 104 are operated by coil 100 in unison and, upon energization of coil 100, are shifted into engagement with their upper contacts to connect relay coils 76a-94a with respective control terminals $A_0$-$A_9$. Similarly, ten relay switches 106 are operated by relay coil 102 and, upon energization of coil 102, connect relay coils 76b-94b with control terminals $F_0$-$F_9$ respectively. A control lead 108 connected to control terminal E is electrically coupled to coils 76b-94b when relay coil 102 is de-energized and relay switches 106 are in engagement with their lower contacts as shown.

Although operation of the switching modules from the system standpoint will be discussed more fully hereinafter, it is instructive at this juncture to appreciate the operation of the control circuitry illustrated in FIG. 7. It should be understood at the outset that the remaining ninety-nine modules are identical in structure to that as shown and described for module 000-009. Control terminals $A_0$-$A_9$ and $F_0$-$F_9$ are coupled with control lines that are common to every module. However, the control lines coupled with terminals B, D and E are radial control lines, there being a set of such lines for every switching module. Terminal C, as illustrated, is a ground connection common to the entire testing system.

FIGURE 1 illustrates that the various control lines to the A series, B, D, E and F series terminals of the modules emanate from control system 20 where excitation of particular lines is effected in accordance with the desired test. For example, if it is desired to energize one or more of the output coils 76a-94a of module 000-009, then the control line from control system 20 connected to terminal B of this module is energized along with one or more of the A series control lines. The other B control terminals of the remaining modules receive no excitation; therefore, the excitation applied to the A series terminals of the remaining modules is ineffective in producing energization of the output coils of these remaining modules since the switches 104 thereof remain open. Thus, only the desired output coil or coils of the desired module 000-009 are energized.

By way of further explanation, energization of the input coils 76b-94b of module 000-009 would be effected by energization of the control line coupled to the E terminal of this module, whereupon lead 108 and switches 106 create circuits through the input coils to ground. Energization of less than all of the input coils 76b-94b is effected in a similar manner to that as described above for the output coils by energizing relay coil 102 via the control line connected to control terminal D and the appropriate control line or lines connected to the F series terminals of module 000-009.

*Terminal selection*

Referring to FIGS. 4, 5 and 6, the test terminals of unit 32 are diagrammatically portrayed in FIG. 4 as arranged in a strip provided with the 50,000 test terminals of the unit. Twelve of these terminals are specifically shown and designated in FIG. 4, such terminals having addresses 00000, 00001, 00049, 00100, 00949, 01000, 01001, 01949, 20000, 20001, 20002, and 99949. Module 000-009 is fragmentarily shown at the bottom of FIG. 4, its connector 000 being connected to terminals 00000, 00001, and 00049 by the 50-conductor adapter cable 56. The remaining terminals having addresses corresponding to the addresses of the other pins of connector 000, i.e., terminals 00002 through 00048, are not shown, it being understood that these terminals are also connected to the associated pins of connector 000 by the other conductors of the adapter cable 56 which are not illustrated.

In similar fashion, the other connectors of the modules associated with the test terminals specifically illustrated in FIG. 4 are shown in electrically coupled relationship to correspondingly addressed terminals. Only the double coil, 50-pole relays of the various modules that are connected to the illustrated connectors are shown in FIG. 4, and only the poles of the relays that correspond to the twelve illustrated test terminals are shown in order to simplify the drawings.

The control circuitry for the relay coils shown in FIG. 4 is not illustrated therein although, as discussed above, such control circuitry forms an integral part of each switching module. Since the control circuit for each module is identical and shown in FIG. 7, the relay coils shown in FIG. 4 are correlated with respective module control circuits by leads labeled "To 104" or "To 106."

The last two significant digits of the addresses of the test terminals illustrated in FIG. 4 are either 00, 01, 02, or 49. For this reason, only four conductors of each bus 46 and 48 are shown in FIGS. 4, 5 and 6 although, as indicated by the notation in the drawings, each bus actually contains fifty conductors corresponding to connector pin addresses 00 through 49. It is the function of the switching modules to electrically couple the pins of selected connectors to the input and output buses so that, ultimately, the particular terminals or sets thereof desired for testing purposes may be electrically coupled to connection points 51, 52 or 53 of master selector station 44 by the programmed operation of the latter.

The master selector station 44 is shown in FIGS. 5 and 6. The lower ends of the buses 46 and 48 in FIG. 4 extend to the output bus connector 110 and the input bus connector 112 of station 44. The four conductors of the output and input buses are designated 46a, 46b, 46c and 46d, and 48a, 48b, 48c and 48d, respectively. The output bus then extends internally of station 44 to the input of a 10-from-50 terminal selector unit 114. A 50-conductor branch cable interconnects with output bus 46, four conductors 116, 118, 120 and 122 of the branch cable being illustrated. Conductors 116-122 are connected to conductors 46a-46d, respectively, and connect the output bus to the switches 124 of a 50-pole relay having an operating coil 126 operably associated with switches 124. Since only the four conductors 116–122 of the 50-conductor branch cable are fully illustrated, it will be understood that only four switches 124 of the 50-pole relay are shown herein.

The input bus 48 extends from connector 112 to the switches 128 of a 50-pole relay having an operating coil 130 operably associated with switches 128. Here again, only the four switches 128 coupled with conductors 48a–48d are shown herein. When switches 128 are in the positions shown in engagement with their lower contacts, the same serve to short the conductors of bus 48 to a short line 132, which ultimately terminates at connection point 53. Shorting of the conductors of input bus 48 corresponds to the de-energized state of relay coil 130, energization of the latter causing shifting of the poles of switches 128 into engagement with their upper contacts to connect the input bus with a 50-conductor branch cable having leads 134, 136, 138 and 140 which are then electrically connected to conductors 48a–48d respectively.

The 50-conductor branch cable including leads 134–140 is connected to the input of a 10-from-50 terminal selector unit 142. Conductors 134–140 are connected to conductors 116–122, respectively, between the input of selector unit 142 and switches 128. Conductors 116–122 of the 50-conductor output bus branch cable extend from the aforesaid junctions with the input bus branch cable to the input of a decade terminal selecting and shorting unit 144. Unit 144 has a single output lead 146 which is connected to short line 132.

Looking now at the internal structure of units 114, 142 and 144, it may be seen that units 114 and 142 are identical, in that unit 114 comprises five 10-pole relays 148, 150, 152, 154 and 156 and unit 142 comprises five 10-pole relays 158, 160, 162, 164 and 166 interconnected in the same manner as the relays of unit 114. Corresponding poles of each relay in unit 114 are electrically interconnected by ten leads generally designated 168 as is clear in FIG. 5, relays 150, 152 and 154 being shown in block diagram form with their connections to relays 148 and 156 omitted for clarity.

The relays of unit 114 are shown de-energized, conductors 46a, 46b and 46c being connected to the normally open contacts of the lower three switches of the ten relay switch bank of relay 148. It will be remembered that leads 46a, 46b and 46c will be coupled with the pins of a particular connector in the switching modules having addresses 00, 01 and 02 respectively during operation of the apparatus. At the same time, conductor 46d will be connected to the pin having the 49 address. Relay 148 is capable of selecting the first decade of pins of the connector coupled with the output bus 46, while relays 150, 152, 154 and 156 are capable of selecting the second, third, fourth or fifth pin decades respectively. Thus, lead 46d is connected to the normally open contact of the uppermost switch of relay 156 and the remaining switch contacts of both relays 148 and 156 are shown as having no connections thereto since the conductors of output bus 46 which connect to these contacts are not illustrated herein, but of course, are actually utilized in the system.

The control terminals connected to the S control lines from control system 20 (FIG. 1) are designated S00–09, S10–19, S20–29, S30–39, and S40–49, these terminals being connected to the coils of relays 148–156 respectively. Thus, it will be appreciated that application of an electrical pulse to a particular S terminal of unit 114 effects energization of the corresponding relay coil and closure of the ten switches thereof to effect a selection of a particular ten pins which have been electrically coupled with output bus 46 in the switching modules. The effect of such selection is to establish electrical continuity between the ten output leads 170, 172, 174, 176 and 178 of unit 114 and the selected pins, such leads being electrically interconnected with respective sets of relay switches as illustrated. Thus, output lead 178, for example, would be connected to the pin addressed 09, 19, 29, 39, or 49, depending on which one of the relays 148–156 is energized.

Terminal selector unit 142 as mentioned above, is identical in internal structure to terminal selector unit 114. The control terminals of unit 142 are designated S'00–09, S'10–19, S'20–29, S'30–39, and S'40–49 and are connected to relays 158–166 respectively. Ten leads generally designated 180 interconnect corresponding poles of the five relays of unit 142 as illustrated for relays 158 and 166. Upon energization of relay coil 130, switches 128 will engage their upper contacts thereby connecting leads 134–140 to conductors 48a–48d. Thus, energization of relay coil 130 and operation of the switching modules cause leads 134–140 to be coupled with pins having addresses 00, 01, 02, and 49 respectively, these leads being connected to the relay contacts within unit 142 in the same manner as described above for unit 114 so that energization of a particular relay within unit 142 will select a particular decade addressed group of connector pins in the switching modules. Ten output leads 182, 184, 186, 188 and 190 are connected to respective sets of relay switches and serve to couple the selected connector pin decade with subsequent selector circuitry to be described hereinafter.

It should also be noted that energization of relay coil 126 effects closure of switches 124 to, in turn, electrically connect leads 116–122 with the input of unit 142. Thus, depending on which of the relay coils 126 or 130 is energized, either the output bus or the input bus may be electrically connected to the input of selector 142. Control of relay coils 126 and 130 is effected via control terminals $R_1$ and $R_2$, respectively, which are connected to the appropriate control lines emanating from control system 20 (FIG. 1).

Energization of relay coil 126 also makes it possible to short selected decades of the pins connected to output bus 46 to short line 132. This is achieved by selecting and shorting unit 144 which is additionally operable to short selected decades of the pins connected to input bus 48 to short line 132 upon energization of relay coil 130.

Unit 144 comprises five 10-pole shorting bar relays 192, 194, 196, 198 and 200. As is clearly shown in FIG. 5, the ten poles of each relay of unit 144 are shorted together and connected to a common lead 202 which joins with output lead 146. The control terminals for unit 144 are designated P00–09, P10–19, P20–29, P30–39, and P40–49 and are electrically connected to the relay coils of relays 192–200 respectively. If, for example, it is desired to short together the pins connected to conductors 116–122 having addresses of 00 through 39, the appropriate control lines of control system 20 (FIG. 1) connected to terminals P00–09, P10–19, P20–29, and P30–39 are energized to pull in relays 192–198 and connect the forty associated conductors to common lead 202. In the drawings, of course, only the three conductors 116, 118 and 120 of these forty selected conductors are illustrated.

Referring to FIG. 6, a 1-from-10 terminal selector unit 204 is shown, the ten leads 170–178 being connected to the input thereof. Unit 204 comprises ten single-pole relays 206, 208, 210, 212, 214, 216, 218, 220, 222 and 224, the relay switches of relays 212–222 being omitted from the illustration of unit 204. The relay coils of the ten relays 206–224 are shown connected to respective control terminals T0, T1, T2, T3, T4, T5, T6, T7, T8 and T9. Energization of a particular relay coil by application of an energizing pulse to the corresponding control terminal by control system 20 (FIG. 1) effects closure of the associated relay switch to electrically connect one of the leads 170–178 with the output lead 226 of unit 204. Output lead 226 terminates at connection point 51, the latter presenting the selected output terminal to the measurement-comparison system 38 (FIG. 1).

A second 1-from-10 terminal selector unit is shown at 228 having its input connected to leads 182–190. The internal structure of unit 228 is identical to unit 204, ten single-pole relays 306, 308, 310, 312, 314, 316, 318, 320, 322 and 324 being employed therein to selectively electrically couple the input leads with the output leads 230 of unit 228. Output lead 230 terminates at connection point 52, the latter serving to present the selected input terminal to the comparator 38 during a continuity test. The control terminals for the ten relays of unit 228 are designated T′0, T′1, T′2, T′3, T′4, T′5, T′6, T′7, T′8 and T′9. The numerical designations of these control terminals, as well as the control terminals of unit 204 correspond to the units digit of the terminal address which will be selected upon application of an energizing pulse to a particular control terminal.

Branch conductors 232, 234, 236, 238, 240, 242, 244, 246, 248 and 250 extend from leads 182–190 respectively, to a units terminal shorting and selecting unit 252. It should be understood that branch conductors 238–248 are separate leads that interconnect with the six leads designated by the reference numeral 188. The ten branch conductors form the input to unit 252 and connect, respectively, with the normally open contacts of ten single-pole relays 254, 256, 258, 260, 262, 264, 266, 268, 270 and 272 shown in their de-energized states. The movable poles of the relays are commoned together by a lead 274. Output lead 276 of unit 252 interconnects lead 274 with short line 132 which terminates at connection point 53, the latter being utilized during insulation tests to provide the necessary test connection to selected groups of shorted test terminals.

The control terminals for the relay coils of relays 254–272 are designated U0, U1, U2, U3, U4, U5, U6, U7, U8 and U9, respectively. During operation of the apparatus, one or more of these control terminals is energized by control system 20 in order to short a particular terminal or terminals to short line 132. The numerical portion of the designation for the control terminals of unit 252 corresponds to the units digit of the address of the terminal that will be affected by application of an energizing pulse to a particular control terminal.

*Continuity resistance test operation*

Operation of the system to effect a continuity resistance test is best described by a number of examples. In the following, it will be understood that punched tape 30 (FIG. 1) is preprogrammed and capable of initiating all necessary commands within control system 20 which are applied to switching system 26 via its various control terminals. The ultimate objective is to operate the various relays of the master selector station and the switching modules of switching system 26 in a manner to present the selected output terminal and the selected input terminal to connection points 51 and 52 (FIG. 6) via paths of electrical continuity through the modules and the selector station.

In the first example it will be assumed that both the output and the input terminals are connected to the same switching module but are associated with different connectors of that module. Referring to FIG. 4, the output terminal of the instant example comprises test terminal 01949, the input terminal comprising terminal 01001. Control system 20, via its control lines 28, effects energization of relay coils 94a and 76b to connect terminal 01949 with conductor 46d of the output bus, and to connect terminal 01001 to conductor 48b of the input bus. The circuit from the output terminal to the output bus is through cable 74 to connector 019, along lead 278 to the switch associated with relay coil 94a, and thence along lead 280 to conductor 46d. The circuit from the input terminal to the input bus is through cable 56 to connector 010, along lead 282 to the switches of relay coil 76b, and thence along lead 284 to conductor 48b of the input bus.

The particular control lines 28 connected to module 010–019 which are energized in order to effect the above are the control lines connected to control terminals $A_9$, B, D and $F_0$ thereof. Thus, relay coils 100 and 102 of module 010–019 are energized to actuate the banks of switches 104 and 106 therein so that impulses applied to terminals $A_9$ and $F_0$ effect energization of coils 94a and 76b of this module.

It will be appreciated at this juncture that all of the fifty pins of connectors 010 and 019 are connected to the output and input buses. Accordingly, test terminals 01000 through 01049, and 01900 through 01949 are connected to the output and input buses. Therefore, it is now necessary to "select" conductors 46d and 48b of the output and input buses in order to present the desired output and input terminals at connection points 51 and 52 (FIG. 7). This is achieved by switching operations in terminal selector 44.

At the same time that the above described switching occurs in module 010–019, the control lines connected to control terminals S40–49, T9, $R_2$, S′00–09, and T′1 are energized. Thus, referring to FIGS. 5 and 6, relays 156 and 224 pull in to interconnect conductor 46d and connection point 51 via a path through the now closed upper switch of relay 156, along lead 178 to relay 224, and thence through the now closed switch of this relay to output lead 226 and connection point 51. Conductor 48b of the input bus is coupled to connection point 52 by operation of relay coil 130 and relays 158 and 308. Thus, electrical continuity is established from conductor 48b to connection point 52 by a path along lead 136 to relay 158, along the appropriate lead 180 to lead 184 and relay 308, and thence through the closed switch of this relay to output lead 230 and connection point 52. Therefore, comparator 38 may apply the desired test stimuli to connection points 51 and 52 to effect a continuity test between terminals 01949 and 01001.

By way of a second example, it is now assumed that the output and input test terminals are associated with different switching modules. If such terminals comprise terminals 01949 and 00001, then the action of the apparatus with respect to module 010–019 is similar to that as described above except that the control lines coupled with control terminals D and $F_0$ of module 010–019 are not energized. Instead, control terminals D and $F_0$ of module 000–009 are excited to energize relay coil 76b of module 000–009, thereby connecting terminal 00001 to conductor 48b of the input bus. The circuit thus created extends through adapter cable 56 of the module to connector 000, along lead 286 to the corresponding switch associated with relay coil 76b, and thence along lead 288 to conductor 48b. Switching operations in the terminal selector are the same as described above.

As a final example of continuity test operation, it will be assumed that the output and input terminals are associated with the same connector. Assuming that the output terminal 00049 and that the input terminal comprises terminal 00001, it may be seen that connector 000 of module 000–009 is the only connector associated with the two test terminals. Under such a condition, the connector is transferred to the output bus and the input bus is not utilized. Thus, the control lines connected to control terminals $A_0$ and B of module 000–009 are excited to effect energization of relay coil 76a of this module, thereby transferring the contents of connector 000 to the output bus.

In the terminal selector, relay coil 130 is not energized but, instead, the control line connected to control terminal $R_1$ is excited to energize relay coil 126 and thereby couple the output bus with both of the terminal selectors 114 and 142. The output terminal is selected as before by application of command signals to control terminals S40–49 and T9. Selectors 142 and 228 are also operated as before by application of excitation to control terminals S′00–09 and T′1. However, in the instant example, the addressed input terminal 00001 is presented to the input of selector 142 by lead 118 which now interconnects the input of unit 142 and conductor 46b of the output bus since switches 124 are closed.

Electrical insulation test operation

Before a discussion of the operation of the switching apparatus during an insulation test is undertaken, it should be understood that the addresses of the test terminals of the unit under test are preprogrammed so that an insulation test may be effected between a selected output terminal and an input connection comprising all of the remaining terminals having either higher or lower order addresses. In the instant system it will be assumed that the programming of terminal addresses is arranged such that the insulation tests are to be effected between a selected output terminal and all remaining terminals having lower order addresses. The selected output terminal, however, must be the lowest order terminal of a multiple terminal set interconnected by relatively low resistance conductive paths. Thus, for example, if terminals 20002, 21015, 22549, and 30125 comprise a terminal set interconnected by relatively low resistance paths, then the insulation test would be effected between terminal 20002 and the remaining lower order terminals 00000 through 20001.

By way of example, it is assumed that the insulation test between terminal 20002 and all lower order terminals is to be effected. The punched tape 30 (FIG. 1) is preprogrammed to initiate the control functions within control system 20 to effect operation of the switching system in a manner to be now described. Module 200-209 is enabled by energization of its relay coil 76a to place the entire contents of connector 200 on output bus 46. This is achieved by energizing the control lines connected to control terminals $A_0$ and B of module 200-209. Energization of relay coil 76a connects terminals 20002, 20001, and 20000 to output bus leads 46c, 46b and 46a, respectively, via leads 290, 292 and 294.

Simultaneously, the remaining lower order modules are enabled in a manner to transfer the contents of all of their connectors to the input bus 48. This is effected by energization of the radial control lines connected to the E control terminals of these lower order modules. It will be appreciated that this effects energization of input coils 76b-94b of every lower order module from 000-009 through 190-199.

Before proceeding with the action of the master selector station 44 shown in FIGS. 5 and 6, it should be understood that, if the selected output terminal is not associated with the lowest order connector of a particular module, it is necessary to transfer the contents of all lower order connectors of that module to the input bus, together with the connectors of the lower order modules. In such a case, the radial control line connected to control terminal E of the module associated with the output terminal would not be energized; instead, excitation would be applied to control terminal D and those F series control terminals corresponding to the lower order connectors.

In the terminal selector, excitation is applied to control terminal S00-09 of selector unit 114 and terminal T2 of unit 204. Since the output terminal 20002 is connected to conductor 46c, the output terminal is coupled by the action of units 114 and 204 to connection point 51 via the following circuit: along conductor 46c to the associated switch of relay 148, through the now closed relay switch and along the appropriate lead 168 to lead 174, into the input of unit 204 to the now closed switch of relay 210, and thence to output lead 226 and connection point 51.

Relay coil 130 is not energized during this insulation test in order to short together all of the conductors of input bus 48. Thus, short line 132 has all of the terminals having addresses from 00000 through 19949 connected thereto through switches 128. The only lower order terminals not connected to short line 132 by switches 128 are terminals 20000 and 20001 which are connected to conductors 46a and 46b of the output bus.

Terminal selector unit 142 and the selecting and shorting units 144 and 252 are utilized to short lower order terminals in the output bus to short line 132. In the instant example, the two terminals 20000 and 20001 must be connected to short line 132, this being effected by energization of the control lines connected to control terminals R1, S'00-09, U0 and U1. Energization of relay coil 126 couples output bus conductors 46a and 46b to the input of selector unit 142 via leads 116 and 118, whereupon energization of relay 158 transfers ten of the conductors of the output bus to output leads 182-190 via the ten leads 180 within unit 142. Thus, energization of relays 254 and 256 of unit 252 by application or excitation to control terminals U0 and U1 shorts leads 182 and 184 to leads 274 and 276 to thereby short terminals 20000 and 20001 to short line 132. Therefore, the insulation test may be effected between connection points 51 and 53, connection point 52 being unused during insulation tests.

Terminal scan

If the comparator 38 (FIG. 1) determines that the value of resistance between connection points 51 and 53 is less than a prescribed value, a test fail condition exists and it is then necessary to scan the various lower order terminals forming the second node (connection point 53) of the insulation test to determine the location of the error terminal. Control system 20, in response to the detection of a test fail condition by the comparator 38, automatically stops the movement of tape 30 and commences the terminal scan operational mode until the error terminal is located, whereupon the test program may then continue after print-out or display of the error terminal location.

Since the teminal scan logic utilized to operate the switching apparatus of the instant invention is in commercial use at the present time and well known to those skilled in the art, the logic elements of control system 20 employed to effect automatic terminal scan are not illustrated herein.

The scanning process utilized by the instant invention is an address oriented scheme based on decimal address values. It will be recalled that the terminal addressing utilized herein by way of example employs five digits comprising a three digit connector number followed by a two digit connector pin or test terminal number. The complete terminal address, therefore, has the following definable parts:

| Terminal address digit: | Symbolic abbreviation |
| --- | --- |
| Connector No.—hundreds digit | C100's |
| Connector No.—tens digit | C10's |
| Connector No.—units digit | C1's |
| Pin No.—tens digit | P10's |
| Pin No.—units digit | P1's |

Utilizing the above symbolic abbreviation, the terminal scan proceeds from larger to smaller groups in the following sequence:

(a) Scan by C100's groups.
(b) Scan by C10's groups within identified C100 group.
(c) Scan by C1's groups within identified C10 group.
(d) Scan by P10's groups within identified connector.
(e) Scan by individual pins within identified P10 group.

Terminal scan is best understood with reference to a specific example. As in the insulation test example set forth above, it will be assumed that the selected output terminal is 20002, and that the latter has been tested with respect to all lower order terminals with a test fail condition resulting. The error terminal within the lower order terminals must be located, and it will be assumed that such error terminal is test terminal 00001.

During terminal scan the control lines connected to control terminals $A_0$ and B of switching module 200–209 remain energized, together with control terminals S00–09 and T2 of the master selector station 44. This maintains electrical continuity between output terminal 20002 and connection point 51.

Control system 20 first connects all lower order terminals of the connector 200 group to connection point 53 by energizing only the control lines connected to control terminals D of module 200–209, $F_0$ (common to all modules), and the following control terminals of selector station 44—$R_1$, S'00–09, T'1, and T'0. Thus, terminals 20001 and 20000 are connected to connection point 53, since these two terminals are the only lower order terminals in the connector 200 group. Comparator 38 then determines that a test pass condition exists as between the output terminal and these two terminals; therefore, the scan proceeds to the next step.

The connectors having addresses of 100 through 199 are connected to the connection point 53 via short line 132 and the shorting switches 128 coupled with input bus 48 by the energization of the ten control lines connected to respective E control terminals of the ten switching modules containing this series of connectors. Since comparator 38 will again indicate a test pass condition, the scan proceeds to the next step and energizes the ten control lines connected to respective E control terminals of the ten modules which contain connectors addressed 000 through 099. Comparator 38 will now register a test fail condition since the error terminal address is 00001, thereby initiating subsequent scanning by groups of ten connectors.

Since each switching module contains ten connectors, scanning by groups of ten connectors is equivalent to scanning module by module. Thus, the control line connected to the E control terminal of module 090–099 is first energized at the outset of this phase of the scan sequence, followed by energization of the control line connected to the E control terminal of module 080–089 since the test pass condition prevails. Manifestly, sequential energization of the E terminal control lines of modules 090–099 through 000–009 will be effected by the control system since the error terminal is located in the lowest order module.

When the ten connectors of module 000–009 are connected to input bus 48, the comparator 38 registers a test fail condition to initiate the third phase of the scan sequence—scanning by C1's or individual connectors. This is effected by energizing the D terminal control lead of module 000–009 and maintaining excitation to this terminal while sequentially energizing terminals $F_9$, $F_8$ . . . $F_0$. It will be appreciated that the sequence continues until control terminal $F_0$ is energized because, until that time, no test fail condition is detected. Upon energization of test terminal $F_0$, however, the presence of the error terminal is detected and the fourth phase of the scan sequence commences.

Scanning is now effected by P10's groups within the identified connector 000. Excitation is applied to control terminal $R_2$ of selector station 44 to remove input bus 48 from short line 132. Simultaneously, excitation is maintained to control terminal $F_0$ and D of module 000–009 so that the contents of connector 000 will remain transferred to input bus 48. Relay coil 130 is maintained in the energized state by application of the energizing command signal to control terminal $R_2$ during the following control terminal energizing sequence: P40–49, P30–39, P20–29, P10–19, and P00–09. At each of these steps until P00–09 is excited, the comparator senses a test pass condition and, therefore, the scan proceeds to the following step until control terminal P00–09 is energized. Manifestly, this couples terminals 00000 through 00009 to short line 132, thereby causing a test fail condition to be detected since this group of terminals includes the error terminal 00001.

The final phase of the terminal scan is initiated by maintaining the contents of connector 000 transferred to input bus 48 while maintaining excitation to control terminals $R_2$ and S'00–09 in the selector station during sequential application of excitation to the following control terminals: U9, U8 . . . U1. The sequence terminates with the energization of the U1 control terminal since, at that time, error terminal 00001 only is now connected to connection point 53. Thus, the address of the error terminal has now been identified by the apparatus.

Having thus described the invention, what is claimed as new and desired to be secured by Letters Patent is:

1. In a circuit testing system for use with a unit to be tested provided with test terminals having predetermined addresses, where a first test connection is to be made to a first selected terminal and a second test connection is to be made to a second selected terminal, switching apparatus for providing said test connections comprising:
 a master selector station having a pair of connection points;
 switching module means provided with a plurality of groups of terminal connection lines, said lines having addresses corresponding to said terminals;
 means for coupling said lines with said terminals to associate each of said groups thereof with a corresponding set of said terminals;
 first and second multiconductor buses extending from said station to said module means, the latter including switching devices coupled with said buses and respective groups, each of said devices being operable to couple its associated group with either of said buses;
 said station being provided with first terminal selector means for establishing electrical continuity between any one of the conductors of said first bus and one of said connection points, and second, selectively operable terminal selector means for establishing electrical continuity between either any one of the conductors of said first bus or any one of the conductors of said second bus and the other of said connection points; and
 control means coupled with said station and said module means for operating the same to couple the line having the same address as the first selected terminal to said one connection point, and to couple the line having the same address as said second selected terminal to said other connection point, whereby said test connections may be effected at said connection points.

2. The invention of claim 1, wherein each of said switching devices has a pair of alternative, mutually exclusive operational states, each device effecting coupling of its associated group with said first bus when the device is one of said states thereof, and effecting coupling of its associated group with said second bus when the device is in the other state thereof.

3. The invention of claim 1, wherein the number of said conductors of each of said buses is at least equal to the maximum number of said lines in any one of said groups thereof.

4. The invention of claim 1, wherein said second terminal selector means includes a terminal selector unit having an input and an output, switching means coupled with said input and said buses and having a first operational state establishing electrical continuity between said first bus and said input and a second operational state establishing electrical continuity between said second bus and said input, and means coupling the output of said selector unit to said other connection point.

5. In a circuit testing system for use with a unit to be tested provided with test terminals having predetermined addresses, where a first test connection is to be made to a first selected terminal and a second test connection is to be made to a number of other selected terminals, switching apparatus for providing said test connections comprising:
- a master selector station having a pair of connection points;
- switching module means provided with a plurality of groups of terminal connection lines, said lines having addresses corresponding to said terminals;
- means for coupling said lines with said terminals to associate each of said groups thereof with a corresponding set of said terminals;
- first and second multiconductor buses extending from said station to said module means, the latter including switching devices coupled with said buses and respective groups, each of said devices being operable to couple its associated group with either of said buses,
- said station being provided with first terminal selector means for establishing electrical continuity between any one of the conductors of said first bus and one of said connection points, second terminal selector means for establishing electrical continuity between at least one other conductor of said first bus and the other of said connection points, and means for shorting the conductors of said second bus to said other connection point; and
- control means coupled with said station and said module means for operating the same to couple the line having the same address as the first selected terminal to said one connection point, and to couple the lines having the same addresses as said number of selected terminals to said other connection point, whereby said test connections may be effected at said connection points.

6. The invention of claim 5, wherein each of said switching devices has a pair of alternative, mutually exclusive operational states, each device effecting coupling of its associated group with said first bus when the device is one of said states thereof, and effecting coupling of its associated group with said second bus when the device is in the other state thereof.

7. The invention of claim 5, wherein the number of said conductors of each of said buses is at least equal to the maximum number of said lines in any one of said groups thereof.

8. In a circuit-testing system for use with a unit to be tested provided with test terminals having predetermined addresses, where a first test connection is to be made to a first selected terminal and a second test connection is to be made to either a single other selected terminal or a number of other selected terminals, switching apparatus for providing said test connections comprising:
- a master selector station having first and second connection point means;
- switching module means provided with a plurality of groups of terminal connection lines, said lines having addresses corresponding to said terminals;
- means for coupling said lines with said terminals to associate each of said groups thereof with a corresponding set of said terminals;
- first and second multiconductor buses extending from said station to said module means, the latter including switching devices coupled with said buses and respective groups, each of said devices being operable to couple its associated group with either of said buses;
- said station being provided with terminal selector means for establishing electrical continuity between any one of the conductors of said first bus and said first connection point means, terminal selector circuitry having a plurality of input connections and output means coupled to said second connection point means, first switching means coupled with said input connections and said first bus and operable to establish electrical continuity therebetween, and second switching means coupled with said input connections, said second bus, and said second connection point means and having a first operational state establishing electrical continuity between said second bus and said input connections and a second operational state shorting said second bus to said second connection point means,
- said selector circuitry including selectively operable means having a first operational mode establishing electrical continuity between any one of said input connections and said output means and a second operational mode shorting selected input connections to said output means; and
- control means coupled with said station and said module means for operating the same, and having a first control mode coupling the line having the same address as the first selected terminal to said first connection point means and simultaneously coupling the line having the same address as said single other selected terminal to said second connection point means, and a second control mode effecting said coupling of the line having the same address as the first selected terminal to said first connection point means and simultaneously coupling the lines having the same addresses as said number of selected terminals to said second connection point means, whereby said test connections, under either test condition, may be effected at said first and second connection point means.

9. In a circuit testing system for use with a unit to be tested provided with test terminals having predetermined addresses, where a first test connection is to be made to a first selected terminal and a second test connection is to be made to a number of other selected terminals, apparatus for effecting said test connections and for scanning said number of selected terminals to locate the error terminal if a test fail condition is found, said apparatus comprising:
- a master selector station having a pair of connection points;
- switching module means provided with a plurality of groups of terminal connection lines, said lines having addresses corresponding to said terminals;
- means for coupling said lines with said terminals to associate each of said groups thereof with a corresponding set of said terminals:
- first and second multiconductor buses extending from said station to said module means, the latter including switching devices coupled with said buses and respective groups, each of said devices being operable to couple its associated group with either of said buses,
- said station being provided with terminal selector means for establishing electrical continuity between any one of the conductors of said first bus and one of said connection points, terminal selector circuitry having a plurality of input connections and output means coupled to the other of said connection points, first switching means coupled with said input connections and said first bus and operable to establish electrical continuity therebetween, and second switching means coupled with said input connections, said second bus, and said other connection point and having a first operational state establishing electrical continuity between said second bus and said input connections and a second operational state shorting said second bus to said other connection point,
- said selector circuitry including selectively operable means for shorting selected input connections to said output means;
- control means coupled with said station and said module means for operating the same to couple the line having the same address as the first selected terminal to said one connection point, and to couple the lines having the same addresses as said number of selected terminals to said other connection point, whereby to present said first and second test connections at said one and said other connection points respectively; and means coupled with said connection points for effecting a test of circuit conditions therebetween, said control means being coupled with said testing means and responsive to a test fail condition for operating the devices associated with the lines having the same addresses as said number of selected terminals, said selectively operable means, and said first and second switching means to successively couple subsets of the last-mentioned lines with said other connection point until the subset associated with the error terminal is found, and to then successively couple individual lines of said subset to said other connection point until the line having the same address as said error terminal is located.

No references cited.

RUDOLPH V. ROLINEC, *Primary Examiner.*

E. L. STOLARUN, *Assistant Examiner.*